United States Patent Office 3,299,965
Patented Jan. 24, 1967

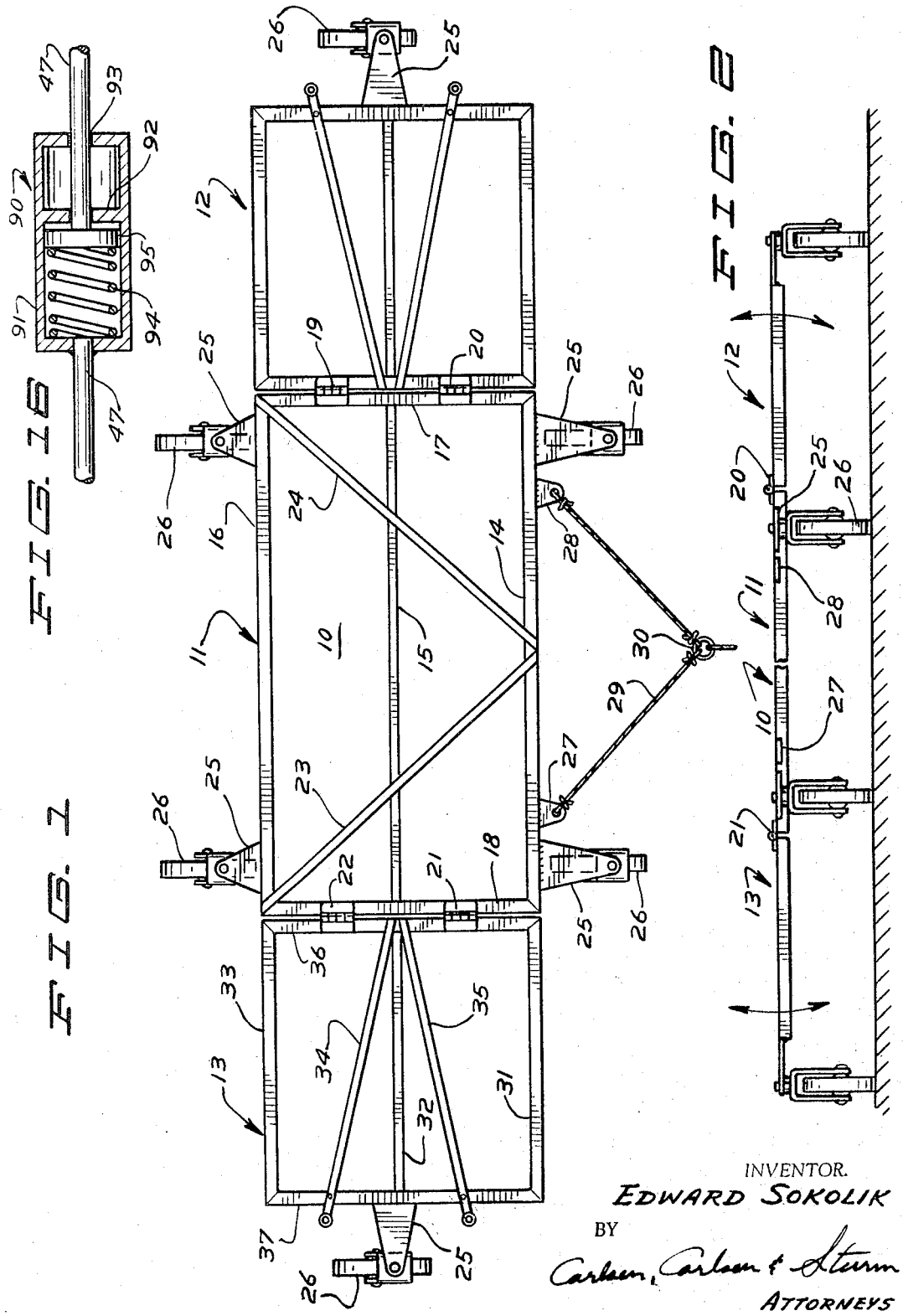

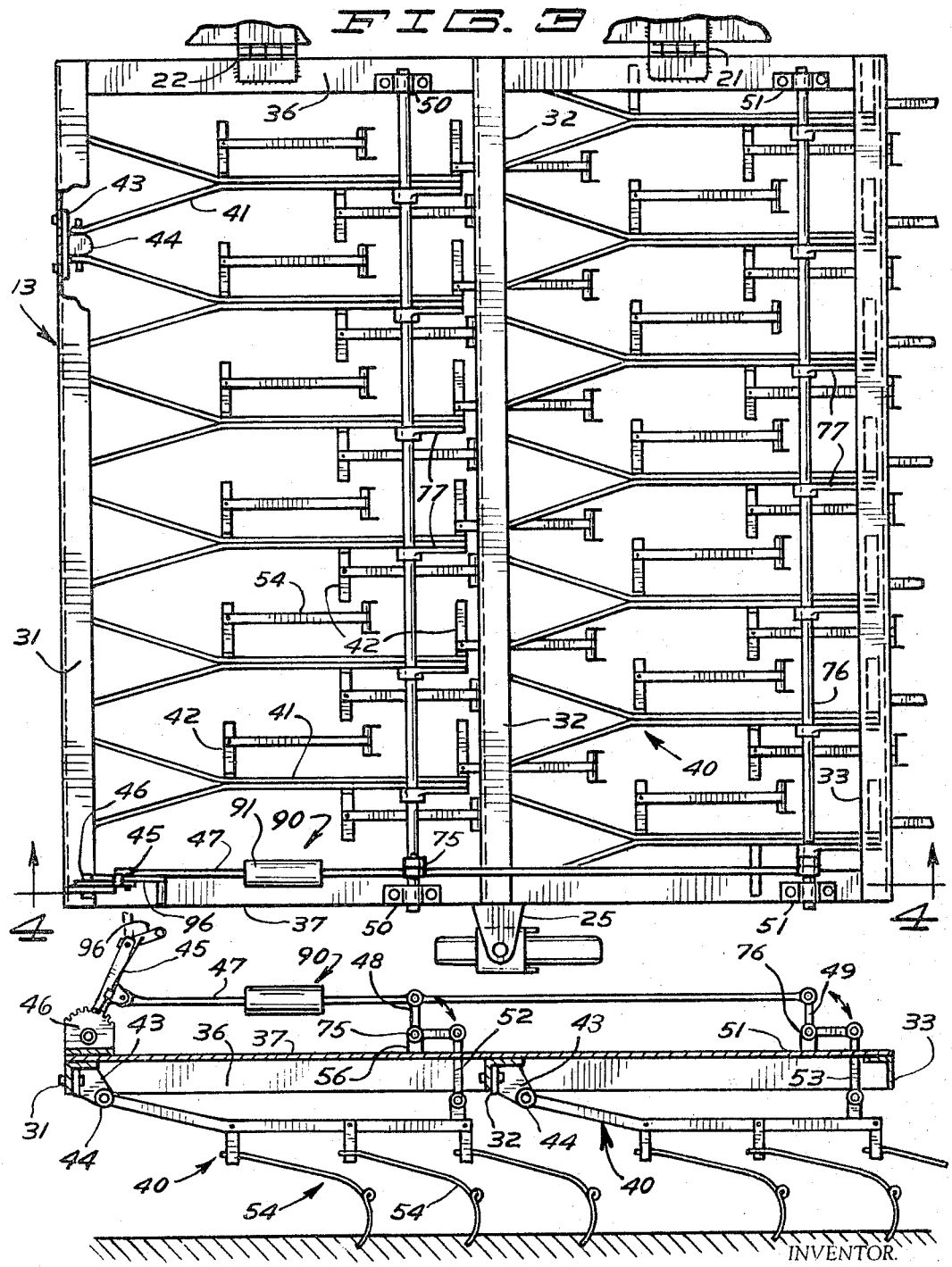

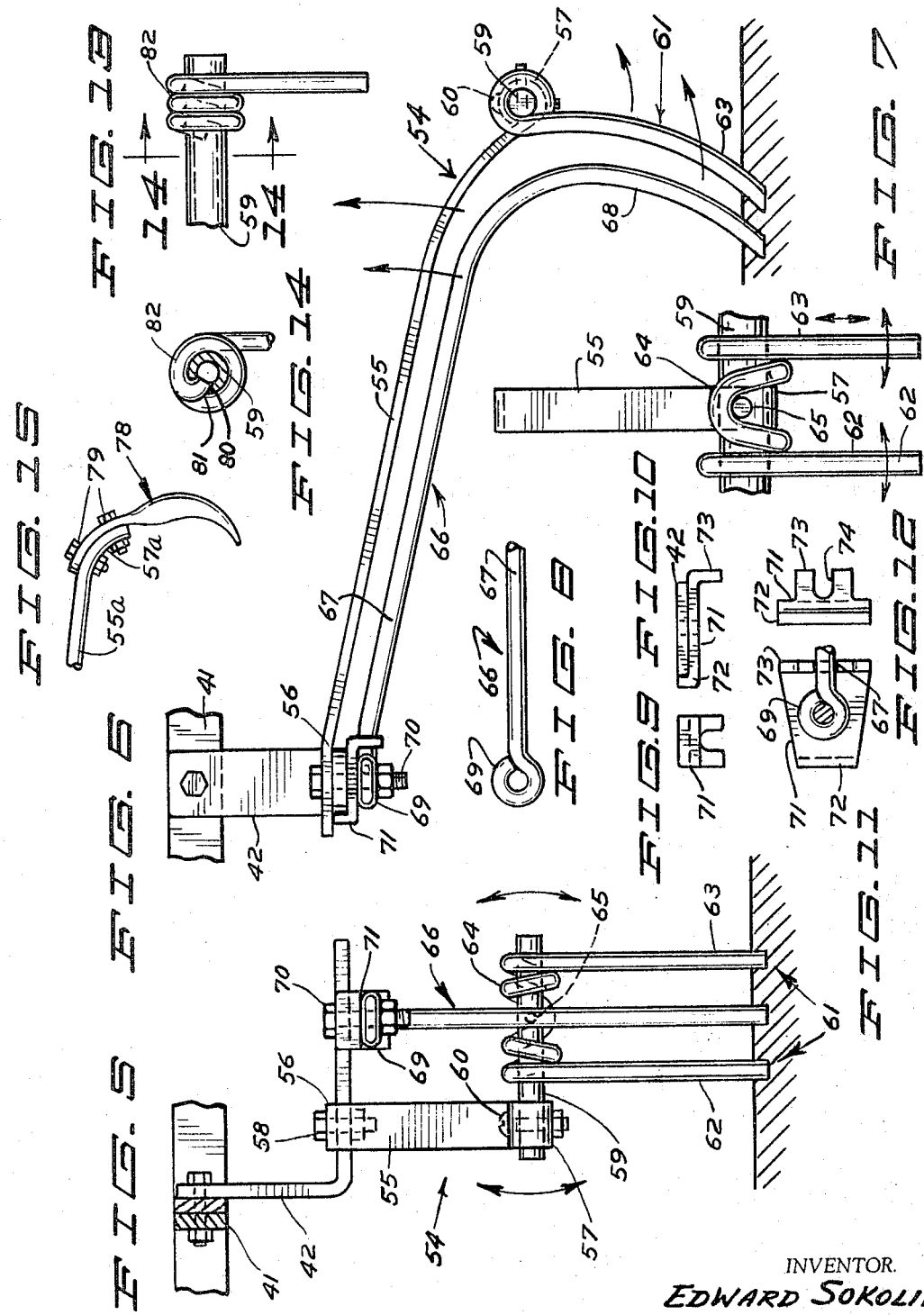

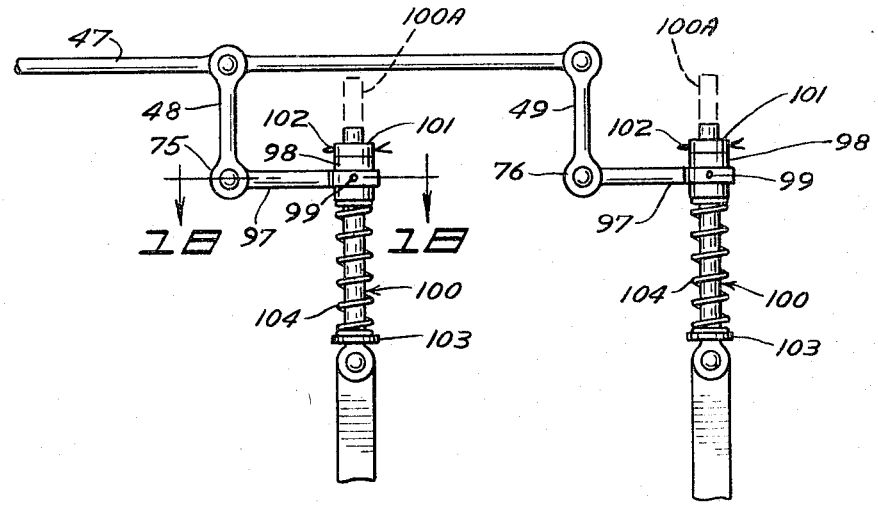
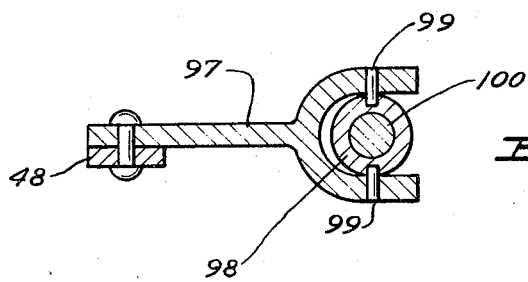

3,299,965
SOIL CONDITIONING APPARATUS
Edward Sokolik, 5601 Dupont Ave. N.,
Minneapolis, Minn. 55430
Filed June 24, 1964, Ser. No. 377,683
3 Claims. (Cl. 172—160)

This invention relates generally to agricultural soil conditioning apparatus and is more particularly directed to a soil conditioning implement which is adapted to be attached to a source of draft power and drawn, or propelled thereby over the surface of an area of soil to be conditioned.

Briefly, my invention is directed to a novel and improved versatile and efficient implement useful, for example, for harrowing, cultivating and subsoiling operations as now practiced in the art of growing crops. The several exemplary uses for my invention will provide a removal or destruction of weeds, a thorough breaking up of the top crust of the earth to retard evaporation or, as in the case of subsoiling, a deeper breaking up of the top layer of soil, particularly in heavy clay soil, to provide a moisture retaining bacterially active seed bed.

My invention includes a portable wheeled flexible frame adapted to support a plurality of earth working implements which may be adjustably positioned relative to the surface of the area to be conditioned. The implement is adapted to provide operation which follows the general contour of the soil over which it is drawn and may conveniently be folded up for storage or transportation to or from an area of soil to be conditioned. My invention also includes an improved soil conditioning device adapted to be supported from a suitable frame in soil engaging position for coaction therewith to provide efficient soil conditioning operation.

It is therefore an object of my invention to provide a novel and improved implement for supporting and carrying soil conditioning devices in operative relationship to an area of soil to be conditioned.

A further object of my nvention is to provide an improved implement for carrying and supporting soil conditioning devices which is adapted to conform to the contour of an area of soil to be conditioned as the implement is drawn over the soil.

Another object of my invention is to provide an improved implement for adjustably supporting a plurality of soil conditioning devices in which the soil conditioning devices may be pivotally adjustable with respect to the implement whereby adjustable positioning of the soil conditioning devices with respect to the implement may be effected to provide a substantially constant level of the soil conditioning devices.

A still further object of my invention is to provide an improved implement which is adapted to support soil conditioning devices in varying combinations of rows and lateral disposition in accordance with the desired soil condition to be effected by drawing the implement over an area of soil to be conditioned.

Another object of my invention is to provide an improved soil conditioning device having increased efficiency and versatility.

A still further object of my invention is to provide a self-cleaning soil conditioning device.

Another object of my invention is to provide an improved soil conditioning device in which the soil engaging portions thereof are provided with a three-degree freedom of motion.

A further object of my invention is to provide an improved soil conditioning device in which soil engaging portions thereof are freely oscillatable in accordance with obstacles encountered thereby.

Another object of my invention is to provide an improved soil conditioning device which conditions soil over which it is drawn by peeling whereby the draft requirements for drawing the device through and over the soil to be conditioned are substantially reduced.

A further object of my invention is to provide an improved soil conditioning device in which the earth engaging portions cooperate upon being dragged through an area of soil to be conditioned to provide a combined springing, vibrating and oscillatory motion of the device.

Other objects and advantages of my invention will become apparent from a consideration of the appended specification, claims and drawings, in which—

FIG. 1 is a plan view of an implement embodying the principles of my invention;

FIG. 2 is a front elevational view of the embodiment of FIG. 1;

FIG. 3 is a plan view of a portion of the implement shown in FIG. 1 with a plurality of soil conditioning implements shown in operative position and mounted thereon;

FIG. 4 is a side sectional view of FIG. 3 taken along section lines 4—4;

FIG. 5 is a front elevational view of one embodiment of a soil conditioning device utilizing the principles of my invention;

FIG. 6 is a side elevational view of FIG. 5;

FIG. 7 is an enlarged partial view of a modification of the apparatus shown in FIGS. 5 and 6;

FIG. 8 is a bottom view of a portion of FIG. 6;

FIGS. 9 and 10 are rear and side view of a portion of FIG. 6;

FIGS. 11 and 12 are bottom and rear view of a further embodiment of the element shown in FIGS. 9 and 10;

FIG. 13 is a front view of a modification of the apparatus shown in FIGS. 5 and 6;

FIG. 14 is a side sectional view taken along section lines 14—14 on FIG. 13;

FIG. 15 is an illustration of a further embodiment of a soil conditioning device that may be utilized in combination with my invention;

FIG. 16 is a sectional view of a connection link shown on FIGS. 3 and 4;

FIG. 17 is a fragmentary side elevation sketch of a modification of the apparatus shown in FIGS. 3 and 4; and FIG. 18 is a sectional view of a portion of FIG. 17 taken along section lines 18—18.

Referring now to FIGS. 1 and 2 of the drawing in which like elements have been identified by like reference characters, there is shown generally a substantially flat rectangular frame 10 which is suitably supported on a plurality of caster wheels 26 and is adapted to be drawn or propelled over an area of soil to be conditioned by a suitable source of draft power which may be connected to a hitching means 30 at the front of frame 10 as shown on the bottom of FIG. 1. Frame 10 is divided into a plurality of frames including a center frame 11 and right and left wing frames 12 and 13 respectively. Each of said frames 11, 12 and 13 includes at least three bar members as shown. Center frame 11 includes a front bar member 14, a center bar member 15 and a rear bar member 16 which are disposed in substantially parallel relationship. The respective ends of said bar-members are suitably connected to right and left end parallel longitudinally extending members 17 and 18 respectively so as to define a substantially rectangular frame member. A pair of diagonal braces 23 and 24 may be suitably attached to front, center and rear bar members 14, 15 and 16 so as to provide rigidity where necessary.

Right wing frame 12 includes as shown, at least three bar-members, front 31, center 32 and rear 33 and is attached to the right end of center frame 11 by a pair of hinge members 19 and 20 which are adapted to allow relative rotational movement of right wing frame 12 with respect to center frame 11. Left wing frame 13 will be seen to be substantially identical to right wing 12 allowing for reversal of some of the elements utilized therein. Left wing 13 includes front, center and rear bar members 31, 32 and 33 respectively which are shown parallelly disposed in a like manner to the corresponding bar members on center frame 11 and right and left end longitudinally parallelly disposed bar members 36 and 37 securely attached to front, center and rear bar members 31, 32 and 33. Side bar member 36 is shown attached to side bar member 18 on center frame 11 through hinges 21 and 22. A pair of diagonally extending brace members 34 and 35 may be utilized to provide rigidity where necessary.

A plurality of self-aligning caster wheel assemblies 26 are shown in supporting relationship to a plurality of laterally extending mounting members 25 disposed at appropriate locations on center frame 11 and right and left wing frames 12 and 13 whereby the entire assembly including frames 11, 12 and 13 may be drawn over an area of soil to be conditioned.

A pair of forwardly laterally extending hitch members 27 and 28 provides a means for attaching a drawing cable 29 which is suitably attached to hitch member 30 for connection to a source of draft power, for example, a tractor. As may be noted from a consideration of the front view of FIG. 2, right and left wing members 12 and 13 are supported at their inboard ends by the hinge members and at their outboard ends by supporting wheel assemblies 26 for rotation about their respective hinge members in the direction indicated by the arrows. This allows the entire assembly, or implement, to conform generally with the contour of the earth over which it is drawn whereby substantially uniform contact with the surface of the soil may be obtained when suitable earth working devices, or instrumentalities, are mounted upon frame 10 as will be described in detail below.

Referring now to FIGS. 3 and 4, there is shown an enlarged representation of left wing frame 13 upon which is mounted suitable means and apparatus for supporting and mounting a plurality of earth working devices, or instrumentalities, as, for example, shown in FIGS. 5 and 6 of the drawing. In FIGS. 3 and 4, a plurality of similarly constructed supporting assemblies for earth working instrumentalities, 40, are shown disposed below left frame 13. Each of the supporting assemblies 40 includes a draw bar 41 comprised of a pair of longitudinally elongated bar members which have been constructed and arranged to provide a bifurcated slightly upwardly extending front end portion that may be suitably pivotally attached to a plurality of mounting means 43, through pin member 44, the draw bars in one row being preferably staggered with respect to those in the other row, as illustrated. Mounting means 43 are shown disposed and attached to the underside of bar members 31 and 32 of frame 13 in the manner shown in FIGS. 3 and 4. A plurality of substantially L-shaped laterally extending support arms 42 are shown attached to and disposed longitudinally in spaced relationship on draw bar members 41. It may be noted that in the embodiment shown, a laterally and longitudinally staggered pattern may be provided dependent upon the lateral and longitudinal disposition of support arms 42. It may thus be seen that each of the supporting assemblies 40 is rotatable about its forward end to provide an adjustment for the height of the lower portions with respect to the surface of the soil over which frame 13 is being drawn.

The rear ends of supporting assemblies 40 may be raised and lowered relative to frame 13 through suitable operating means pivotally connected to linkage members 52 and 53 shown rotatably attached to the top of the rear portions of draw bar members 41 and extending upwardly in proximity to bar members 32 and 33 respectively. The upper ends of linkage members 52 and 53 are in turn pivotally connected to generally horizontally extending lever arms 77 which are non-rotatably disposed on a pair of shaft members 75 and 76 whereby rotation of shaft members 75 and 76 will impart an upward or downward displacement to the rear ends of supporting assemblies 40 through lever arms 77 and linkage members 52 and 53. Shaft members 75 and 76 are provided at their left hand ends with a pair of bell crank members 48 and 49 respectively that are in turn connected to an actuator rod 47 that is pivotally connected to a lever operating arm 45 for rotation of shaft members 75 and 76 in accordance with the relative position of lever arm 45 with respect to a mounting means 46 upon which it is pivotally journaled. Mounting means 46 is provided with a plurality of grooves for engagement with a locking lever shown disposed on lever arm 45 in a manner well known to those skilled in the art.

Actuator rod 47 is shown having a resilient connecting link indicated generally by reference character 90. Connecting link 90 is shown in section in FIG. 16 as comprising a generally cylindrical housing 91 that is affixed at its left end to the left end section of rod 47. Housing 91 is provided with an axial bore 93 in its right end for the right section of rod 47. A bushing 92 having an axial bore for the right section of rod 47 is telescopically disposed in the right end of housing 91. The left end of the right section of rod 47 is provided with a piston 95 that is slidably disposed between the bushing 92 and the coil spring 94, and adapted to compress the coil spring in the left end portion of the housing 91. It may thus be seen that a force imparted to the left section of rod 47 will be directly transmitted to its right section and thence to shaft members 75 and 76. Conversely, rotation of shaft members in a reverse direction tending to move the right section of rod 47 into cylinder 91 will result in compression of spring 94 to accommodate transient forces that may occur as a result of, for example, the passage of the earth conditioning units vertically over large obstacles. It is anticipated that like connecting links may be provided on rod 47 intermediate shafts 75 and 76 or each connecting link 52 and 53 may likewise be provided with connecting links functionally equivalent to the devices indicated generally by reference character 90. Shaft members 75 and 76 are shown journaled in suitable mounting means 50 and 51 respectively which are in turn suitably mounted on right and left end members 36 and 37 of frame 13. It may thus be seen that rotation of lever arm 45 about notched mounting 46 will impart a rotation to shaft members 75 and 76 to control the relative position of the rear ends of supporting assembly 40 with respect to the bottom of frame 13 or the soil over which frame 13 is moving. It may be noted at this point that lever arm 45 may be operative in two different modes. In the position of a toggle 96 shown in solid outline, lever arm 45 is retained in a predetermined position to maintain the lower ends of the soil conditioning units at a predetermined position with respect to frame 13. In this mode of operation, resilient connecting link 90 will allow upward movement of the rear ends of the said conditioning units against the force exerted by spring member 94. In the second mode of operation, toggle 96 is placed in the position indicated by dotted outline and the lower ends of the soil conditioning units are free to move upward and downwardly, or trail, with respect to frame 13, to follow the general contour of the soil or to pass over any obstacle encountered.

FIGS. 17 and 18 illustrate a further embodiment of the principles described above in regard to connecting link 90 shown in FIGS. 3, 4 and 16. In FIGS. 17 and 18, a fragmentary portion of the apparatus for determining the position of the earth working implements relative to the earth is shown comprising; an actuator arm 47 that is operatively connected to bell crank members 48 and 49 that are in turn connected to shaft members 75 and 76 respectively and a pair of connecting link members 100 adapted to support the rear ends of drawbar members 41 as described above. Each of the connecting link members 100 is provided with a stop collar 103, which may be formed integrally with members 100, at its lower end and a stop collar 101 disposed at its upper end and fastened to link 100 with suitable fastening means shown in the form of a cotter key 102. The rear end 97 of each of the bell crank members is shown bifurcated to receive a bearing member 98 that is rotatably journaled in the bifurcated portion by suitable means shown in the form of transversely extending pin members 99. As shown in FIGS. 17 and 18, the intermediate portion of link members 100 is dimensioned to be slidably received in bearing member 98. A compression spring member 104 is shown disposed around link members 100 as extending between the lower end of bearing member 98 and stop collar 103. The entire assembly will normally assume the position shown in solid outline in FIG. 17 and may, in response to upwardly directed forces in excess of the downward force of spring members 104, assume the position indicated in dotted outline by reference character 100A. It may thus be understood by those skilled in the art that the embodiment shown in FIGS. 17 and 18 will be operative to allow the rear ends of the individual drawbar members 41 to move upwardly to allow the soil conditioning devices to pass over obstacles encountered in moving the entire apparatus over an area of soil to be conditioned.

Also shown on FIGS. 3 and 4 are a plurality of earth working instrumentalities indicated generally by the reference character 54 and are shown attached at one end and rearwardly disposed from support arms 42. While not shown on the drawing, one such earth working instrumentality may be attached and rearwardly disposed from each of the support arm members 42 on supporting assembly 40. The provision of like apparatus on center frame 11 and right wing frame 12 will provide a complete versatile and efficient soil conditioning implement.

Referring now to FIGS. 5 and 6 of the drawing, a novel and improved earth working device, or instrumentality, is indicated generally by reference character 54 and includes a compound spring composed of an elongated leaf spring capable of springing upwardly and a binary coil spring capable of springing rearwardly. Earth working instrumentality 54 is suitable for attachment to frame 10 in the manner described above and may be utilized in any one of several embodiments which will be described below. In FIGS. 5 and 6, a portion of drawbar 41 is shown as having attached thereto a downwardly depending and laterally extending support arm 42 to which is attached a flat leaf spring member 55 having a front end 56 attached to the laterally extending portion of support arm 42 by a suitable bolt 58 and having a rear end 57 which may preferably be looped to receive a transversely extending support member 59 which may be comprised of a length of heavy tubing and which is non-rotatably attached to the rear end 57 of leaf spring member 55 by a bolt indicated generally by reference character 60. While the preferred embodiment of member 55 is that shown and described above as a leaf spring, it may also be comprised of material that is relatively stiff and inflexible. A binary coil spring 61 is shown disposed and mounted upon transverse support member 59. Binary coil spring 61 is provided with a pair of downwardly extending elongated arcuate prongs 62 and 63 and is coiled laterally from a central portion thereof and non-rotatably retained in position on transverse support member 59 by a suitable mounting means, shown in the form of a pin 65. As may be noted from the drawings, binary coil spring 61 may be formed of a single piece of spring wire having substantial resiliency characteristics, or from two separate pieces of spring wire.

The last described elements comprise a suitable earth working instrumentality which may, under certain conditions of operation, also be provided with a further spring member 66 having a center shank 67 and a downwardly and rearwardly extending prong portion 68 which may preferably be formed with an arcuate shape in the manner shown on the drawing. The front end of spring 66 is provided with a loop 69 that is adapted to receive and be engaged by a suitable bolt 70 extending through the laterally extending portion of support arm 42 and a suitable cleat member 71, which is configured to retain spring 66 in a predetermined relationship with the laterally extending portion of arm 42 as indicated on the drawing. In the embodiment shown, spring member 66 is shown with its earth engaging prong 67 disposed between and slightly forwardly of prongs 62 and 63 on binary coil spring member 61. It may now be appreciated by those skilled in the art that the earth engaging prongs 62 and 63 on binary coil spring 61 have a substantially three-degree freedom of motion as indicated generally by the arrows on FIGS. 5 and 6. The prongs may oscillate and vibrate laterally, upwardly and downwardly, or forwardly and rearwardly as the earth working instrumentality is drawn over the surface of the soil which provides an efficient soil conditioning operation and which also provides a self-cleaning operation with respect to loose material, such as straw and the like, that may be present on the surface of the soil.

In FIGS. 9 and 10 one embodiment of a cleat 71 is illustrated in a rear and side view in position on the laterally extending portion of support arm member 42 showing the coaction between the flange 72 adapted to maintain a predetermined relationship with support arm 42 and flange 73 adapted to retain the forward part of spring 66 in a predetermined relationship with support arm member 42. FIGS. 11 and 12 show a further embodiment of cleat 71 in which flange members 72 and 73 extend in the same direction whereby loop 69 on the front end of spring member 66 is retained between cleat 71 and the lower surface of the laterally extending portion of support arm member 42.

FIG. 7 illustrates a modification of a mounting arrangement for binary coil spring 61 in which the center portion of binary coil spring 61 is positioned symmetrically with respect to the rear portion 57 on leaf spring member 55.

In FIGS. 13 and 14 a further modification of a mounting arrangement for coil springs to be mounted and non-rotatably disposed on transverse support member 59 is shown in which a hole 80 is provided in transverse support member 59 and is adapted to receive an inwardly extending end 81 on coiled portion 82 on a spring that may be arcuately shaped as shown in connection with binary spring member 61 and spring member 66.

In FIG. 15, a cultivator 78 is shown attached to the rear end 57a of spring 55a through suitable bolt members 79.

*Operation*

In describing the operation of my apparatus, it will be assumed initially that a plurality of the desired and suitable earth working instrumentatilies 54 have been attached in the manner described above to the support arms 42 on supporting assemblies 40 and the implement is in readiness to be transported to an area in which the soil is to be suitably conditioned. Transportation of the embodiment shown in FIGS. 1 and 2 may easily be accomplished by folding right and left wing frames 12 and 13 upwardly and retaining the same in position through suitable means (not shown). The implement may then be towed to the area in which the work is to be performed. Upon reaching the area, right and left wing members may be returned to the position shown in FIG. 2 and suitable adjustment of the level of the earth working instrumentalities 54 through actuation and position of lever arms 45 may be effected. The implement may then be drawn over the surface of the soil to be conditioned by suitable source of draft power and because of the manner in which right and left wing members 12 and 13 are hingedly attached to frame 11, substantial conformity to the contour of the soil will be obtained with the resulting uniformity of conditioning of the surface of the soil. The implement may optionally be towed end-wise.

As described above, the action of binary spring members 61 mounted on leaf spring members 55 is that of continued oscillation and vibration as obstacles normally present in the surface of the soil are encountered whereby a self-cleaning operation of devices 54 and a thorough conditioning of the surface of the soil is obtained. Where desirable, the additional spring member 66 may be attached in the manner shown which will contribute to the operation of the earth engaging instrumentality performing the desired function.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In apparatus of the class above described, the combination comprising; a frame, wheels adapted to support the frame in predetermined relationship with the surface of the ground over which it may be drawn, a plurality of draw bar units laterally disposed beneath said frame, each of said draw bar units being pivotally connected to said frame for rotation about a horizontal axis transverse to the intended direction of travel of the apparatus and including a plurality of laterally extending support arm members; means on said frame for raising and lowering the rear ends of said draw bar units relative to said frame; a plurality of soil conditioning devices disposed at predetermined locations on the support arm members of said draw bar units, said soil conditioning devices being comprised of a leaf spring member connected at one end to the support arm members on said draw bar units and including a transversely extending support member at the other end thereof and a binary coil spring non-rotatably disposed on said transverse support member, said binary coil spring having a pair of free end portions adapted to engage the surface of the earth and extending downwardly from the transverse support member on said leaf spring, disposed at a downward angle from the support arms on said draw bar units.

2. In apparatus of the class above described, the combination comprising; a frame, wheels adapted to support the frame in predetermined relationship with the surface of the ground over which it may be drawn, a plurality of draw-bar units laterally disposed beneath said frame, each of said draw-bar being pivotally connected with said frame for rotation about a horizontal axis transverse to the intended direction of travel of the apparatus and including a plurality of laterally extending support arm members; means on said frame for raising and lowering the rear ends of said draw-bar units relative to said frame; a plurality of soil conditioning devices disposed at predetermined locations on the support arms of said draw-bar units, said soil conditioning devices being comprised of a longitudinally extending member connected at one end to the support arms on said draw-bar units and including a transversely extending support member at the other end thereof and a binary coil spring non-rotatably disposed on said transverse support member, said binary coil spring having a pair of free-end portions adapted to engage the surface of the earth and extending downwardly from the transverse support member and being disposed at a downward angle from the support arms on said draw-bar units.

3. Soil condition apparatus comprising a mobile frame, an elongate draw bar extending in the direction of intended travel of said apparatus and having the forward end thereof pivotally attached to the frame for rotation about a horizontal transverse axis, an elongate first spring member extending in the intended direction of travel of said apparatus, the forward end portion of said first spring member being steadfastly attached to said draw bar so that the rearward portion of said first spring member is free to vertically oscillate up and down, a binary coil spring non-rotatably attached to said rearward portion of said first spring member and having a pair of downwardly and forwardly extending earth engaging free end prong portions which, in cooperation with said first spring member, are adapted to oscillate laterally, forwardly and rearwardly, and up and down when drawn through an area of soil to be conditioned, and including a third spring member comprised of an elongate wire spring extending in the direction of travel having its forward end fixedly connected to said draw bar and having a downwardly and forwardly earth engaging free end portion positioned intermediate the prongs of said binary coil spring and forwardly thereof, there being no direct connection between said third spring member and said first spring member and the binary coil spring supported thereby.

References Cited by the Examiner

UNITED STATES PATENTS

| | | | |
|---|---|---|---|
| 285,797 | 10/1883 | Chapin | 172—506 X |
| 1,086,015 | 2/1914 | Billhorn | 172—643 |
| 2,758,531 | 8/1956 | Siems | 172—142 |
| 3,077,935 | 2/1963 | Smith | 172—297 X |

FOREIGN PATENTS

| | | |
|---|---|---|
| 215,296 | 5/1958 | Australia. |
| 702,466 | 2/1948 | Germany. |
| 70,417 | 10/1927 | Sweden. |

ABRAHAM G. STONE, *Primary Examiner.*

ANTONIO F. GUIDA, T. GRAHAM CRAVER, J. R. OAKS, *Assistant Examiners.*